US00RE38011E

(19) United States
(12) Reissued Patent
Cheng

(10) Patent Number: US RE38,011 E
(45) Date of Reissued Patent: Mar. 4, 2003

(54) OPTICAL FIBER CONNECTOR

(76) Inventor: Yu-Feng Cheng, No. 7, Fuhsing St., Tucheng Ind. Dist., Tucheng City, Taipei Hsien (TW)

(21) Appl. No.: 09/651,984

(22) Filed: Aug. 30, 2000

Related U.S. Patent Documents

Reissue of:
(64) Patent No.: 5,963,690
Issued: Oct. 5, 1999
Appl. No.: 09/010,078
Filed: Jan. 20, 1998

(51) Int. Cl.[7] ..... G02B 6/36
(52) U.S. Cl. ..... 385/76; 385/78
(58) Field of Search ..... 385/53, 60, 72, 385/75–78, 84, 88, 92, 137–139

(56) References Cited

U.S. PATENT DOCUMENTS 4,579,418 A * 4/1986 Parchet et al. ..... 385/60
4,730,891 A * 3/1988 Poorman ..... 385/74
5,293,582 A * 3/1994 Beard et al. ..... 385/78

* cited by examiner

*Primary Examiner*—John D. Lee
*Assistant Examiner*—Juliana K. Kang
(74) *Attorney, Agent, or Firm*—William E. Pelton, Esq.

(57) ABSTRACT

An optical fiber connector includes a head lid, a connection head, an interior tube, and an exterior tube combined with each other to enclose an end of an optical fiber. The optical fiber connector in accordance with the present invention includes only a few components. In addition, each component of the optical fiber connector is simple. Accordingly, such an optical fiber connector is easily manufactured, and the manufacture cost is low.

6 Claims, 4 Drawing Sheets

OPTICAL FIBER CONNECTOR

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an optical fiber connector, more particularly, to an optical fiber connector which can be manufactured by a simple process and having a low cost.

2. Description of Related Art

Optical fibers have been widely used in the field of communication such as video, audio transmission, since such a transmission medium has many known advantages such as high accuracy. However, the optical fiber cannot be connected to an optical fiber connector in the same way as the metal wire which can be directly soldered to a connector. A specifically designed optical fiber connector is necessary for the optical fiber so that the optical fiber can be conveniently connected to a device via the optical fiber connector.

A conventional optical fiber connector is shown in FIG. 4. The optical fiber connector comprises a casing 50, a lower hemicylindrical piece 51 extending from the casing 50, an upper hemicylindrical piece 55 to be engaged with the lower hemicylindrical piece 51, a connection head 60, a flexible portion 62, and an exterior tube 65. As can be seen in FIG. 4, an optical fiber 70 is enclosed by a shield 75 and extends to an end of the connection head 60.

The lower hemicylindrical piece 51 has a pair of projections 52 respectively formed on a front portion of each of two edges thereof, a pair of recesses 53 respectively defined in a rear portion of each of the two edges, and a flange 54 formed on a middle portion of an inner wall thereof. The upper hemicylindrical piece 55 has a pair of recesses 56 (only one is shown) respectively defined in a front portion of each of two edges thereof, another pair of recesses 57 (only one is shown) respectively defined in a rear portion of each of the two edges thereof, and a tongue 59 defined by two slots 58 defined therein. The tongue 59 has an engaging piece 590. When the upper hemicylindrical piece 55 is combined with the lower hemicylindrical piece 51, the two projections 52 extend into the two recesses 56, respectively, to engage the lower hemicylindrical piece 51 and the upper hemicylindrical piece 55 with each other. Each of the two recesses 53 and a corresponding one of the two recesses 57 define a slot when the lower hemicylindrical piece 51 and the upper hemicylindrical piece 55 are combined together.

The connection head 60 is used for holding the optical fiber 70 with the shield 75 provided therearound. The connection head 60 is disposed on a base 61. A stepped neck 63 is provided following the base 61. The stepped neck 63 has a pair of posts 64 formed thereon to extend into the two slots respectively defined by the recesses 53 and 57 when the connection head 60 extends into a central through hold defined in the casing 50. The flexible portion 62 is provided behind the stepped neck 63 to allow the optical fiber 70 to flex.

For assembling the optical fiber connector, as mentioned above, the connection head 60 extends through the central through hole of the casing 50, the upper hemicylindrical piece 55 is engaged with the lower hemicylindrical piece 51 by the projections 52 extending into the recesses 56, and the two posts 64 extend into the two slots defined by the recesses 53 and 57. Finally, the resultant product extends into the exterior tube 65 and the engaging piece 590 extend through an engaging slot 66 defined in the exterior tube 65, so that the exterior tube 65 is firmly combined with the resultant product, and an optical fiber connector is completed.

As can be seen from FIG. 4 and the above descriptions, the structure of the conventional optical fiber connector is very complicated. In addition, defective products are often generated in the injection molding process, since some components of the conventional optical fiber connector have many projections and recesses, and the manufacture cost is also increased.

SUMMARY OF THE INVENTION

One object of the present invention is to provide an improved optical fiber connector having a simple structure.

Another object of the present invention is to provide an improved optical fiber connector which can be easily manufactured.

In accordance with one aspect of the present invention, the optical fiber connector comprises a head lid, a connection head, an interior tube, and an exterior tube combined with each other to enclose an end of an optical fiber in a simple manner.

Other objects, advantages and novel features of the invention will become more apparent from the following detailed description when taken in conjunction with the accompanying drawings.

DETAILED DESCRIPTION OF PREFERRED EMBODIMENT

Figure 1:
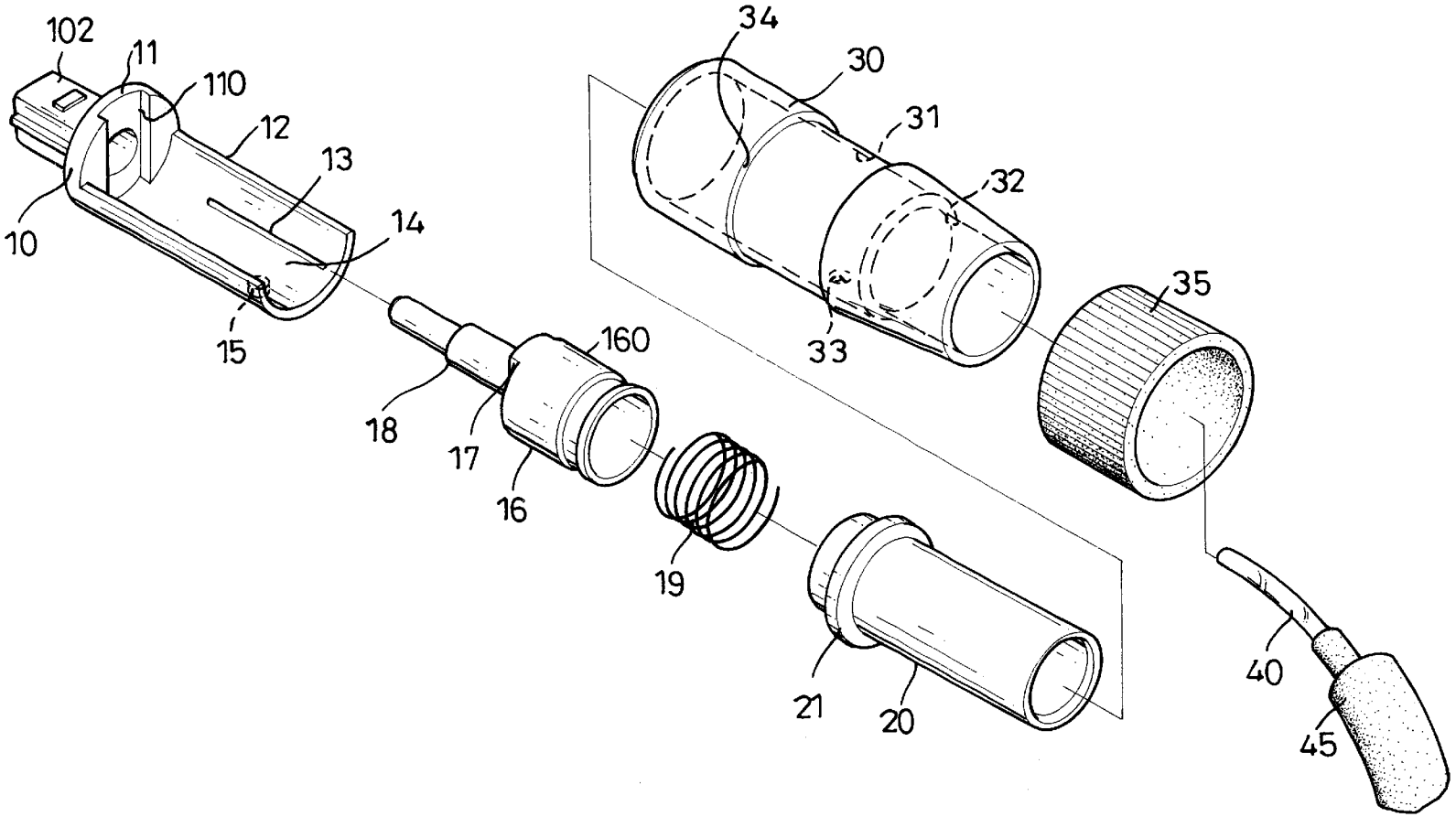
FIG. 1 is an exploded perspective view of an optical fiber connector in accordance with the present invention.
Figure 2:
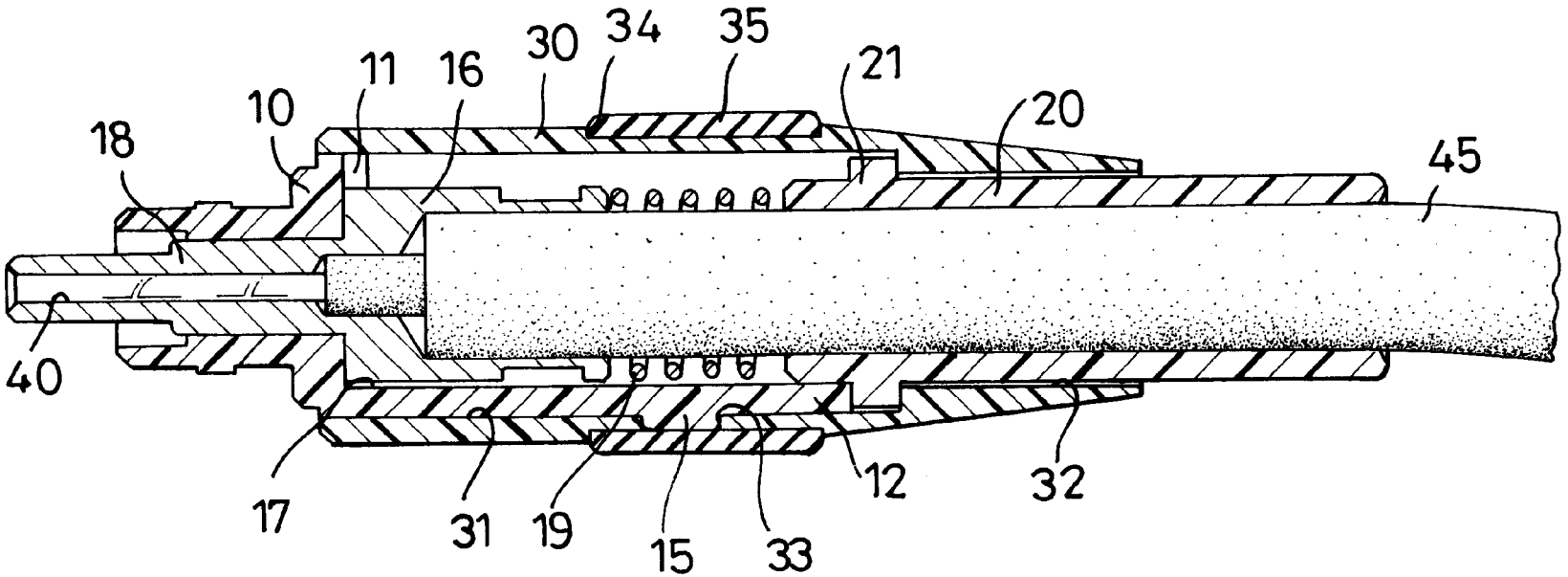
FIG. 2 is a longitudinal sectional view showing a combination state of the optical fiber connector in accordance with the present invention.
Figure 3:
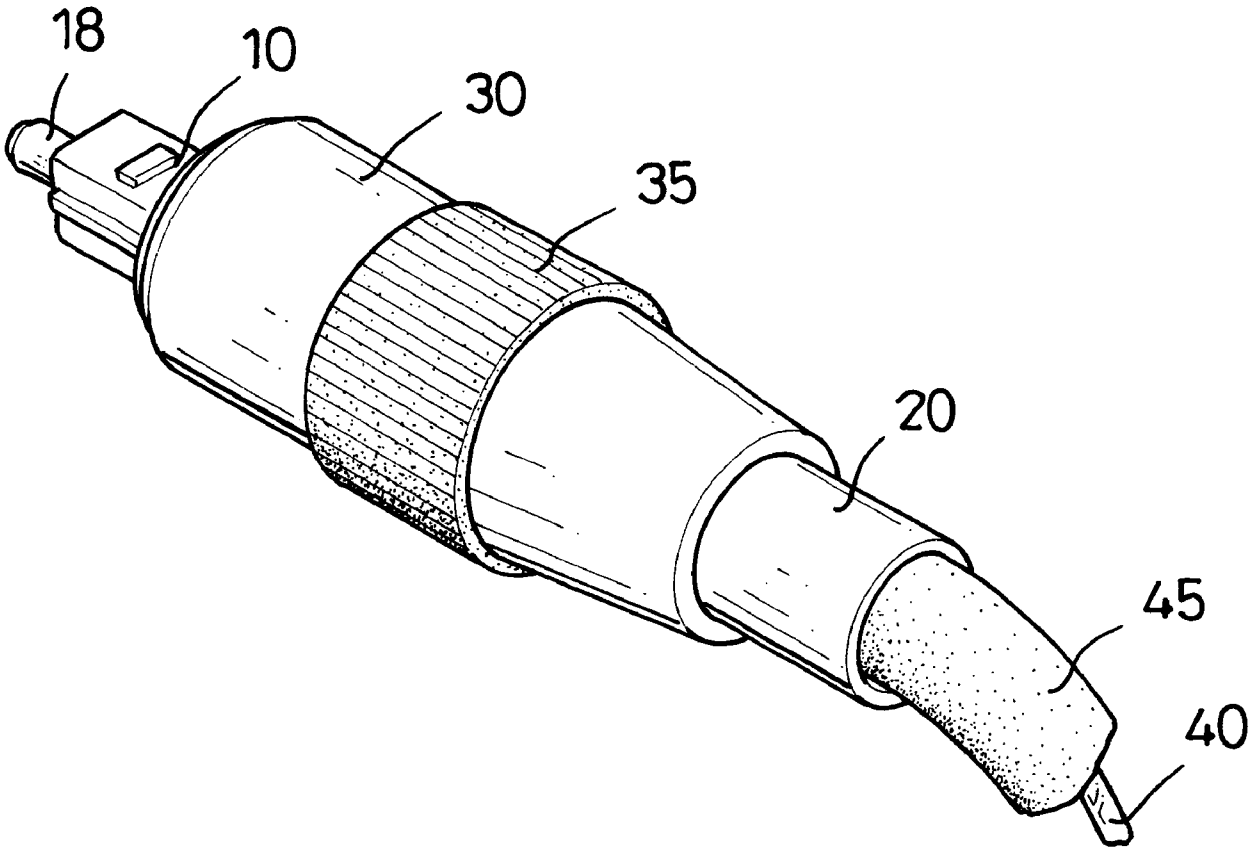
FIG. 3 is a perspective view showing the combination state of the optical fiber connector in accordance with the present invention.
Figure 4:
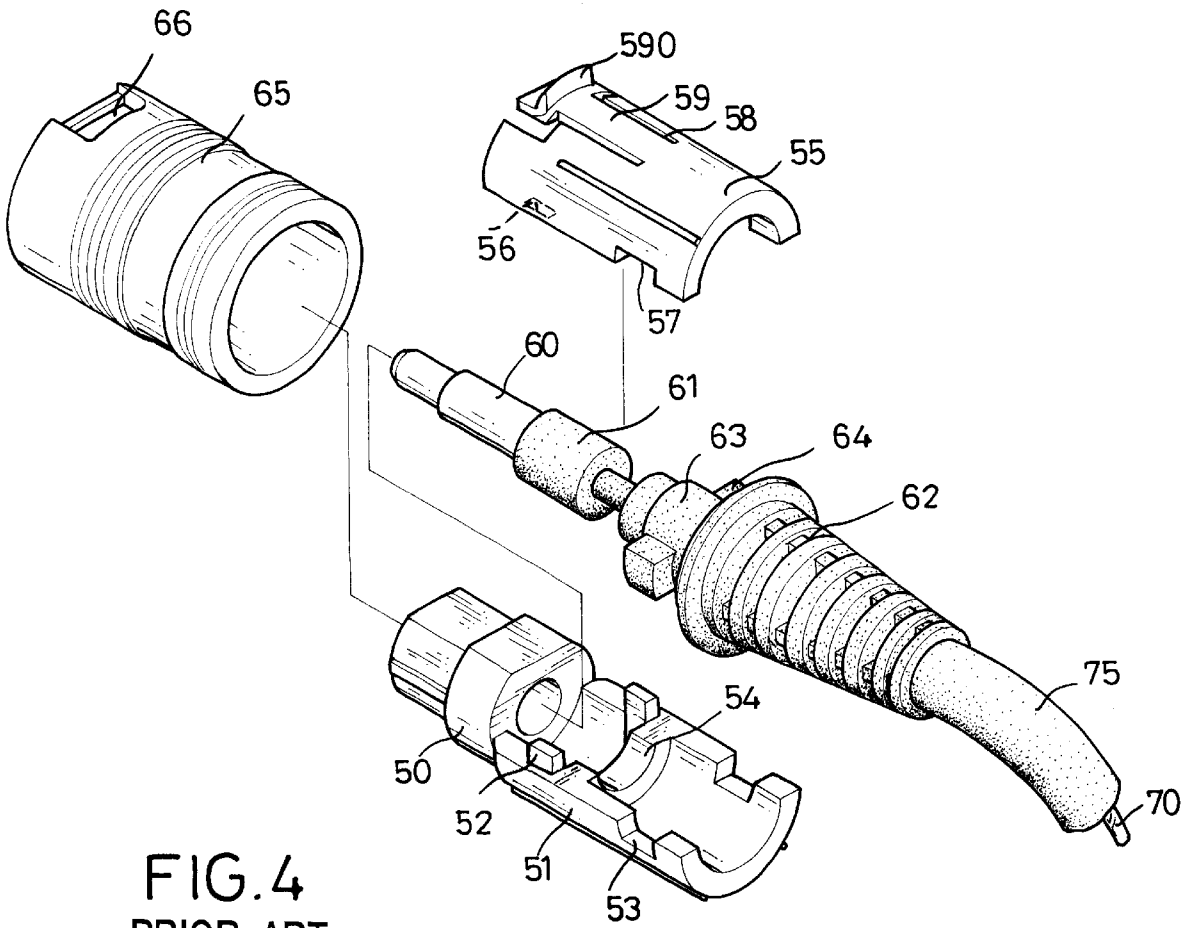
FIG. 4 PRIOR ART
FIG. 4 is an exploded perspective view of a conventional optical fiber connector.

Referring to FIGS. 1, 2 and 3, an optical fiber connector in accordance with the present invention comprises a head lid 10, a connection head 16, an interior tube 20 and an exterior tube 30.

The head lid 10 has a disc 11 having a central hole defined therein, a hollow terminal portion 102 extending from a front surface of the disc 11, and a hemicylindrical piece 12 extending from a rear surface of the disc 11. The disc 11 has a longitudinal recess 110 defined in the rear surface thereof. The hemicylindrical piece 12 has two slits 13 defined therein to define a tongue 14. A boss 15 is formed on an outer wall of the hemicylindrical piece 12 near an end of the tongue 14 and between the slits 13. The purpose of the slits 13 is to provide a resilient portion of the hemicylindrical piece 12 whereby the boss 15 can be pushed inward and then return to its original position when pressure is released therefrom.

The connection head 16 comprises a body 160, which has a first end from which extends a projection 17, and a stepped pillar 18 for enclosing and holding an end of an optical fiber 40, and a second end which is a simple end face. The projection 17 is shaped in correspondence with the recess 110, so that the projection 17 is matchingly received in the recess 110 when the connection head 16 is combined with the head lid 10.

The interior tube 20 has a flange 21. An optical fiber cable comprising the optical fiber 40 and a shield 45 enclosing the optical fiber 40 is extended through the interior tube 20. A compression spring 19 is disposed between the interior tube 20 and the connection head 16.

The exterior tube 30 is divided into two portions by inner diameters, that is, a first section 31 having a large inner diameter and a second section 32 having a smaller inner diameter. The first section 31 has a hole 33 defined therein to receive the boss 15 of the head lid 10 when the optical fiber connector is assembled. The exterior tube 30 has a loop recess 34 defined in an outer wall thereof for receiving a protecting tube 35.

To assemble the optical fiber connector, the optical fiber cable including the optical fiber 40 and the shield 45 extends through the protecting tube 35, the exterior tube 30, the interior tube 20, and the compression spring 19. The optical fiber 40 further extends into the body 160 of the connection head 16, to be retained therein in a conventional manner in the stepped pillar 18. The interior tube 20 is extended into the exterior tube 30 and the flange 21 of the interior tube 20 is pushed by the compression spring 19 against a step-like junction edge between the first section 31 and the second section 32. The connection head 16 is engaged with the head lid 10 by the stepped pillar 18 extending through the central through hole of the disc 11 and the hollow terminal portion 102 and the recess 110 matchingly receiving the projection 17. The interior tube 20 combined with the exterior tube 30 is then pushed toward the head lid 10 so that the hemicylindrical piece 12 is extended and received in the exterior tube 30, and the boss 15 of the head lid 10 is received in the hole 33 of the exterior tube 30. Accordingly, those components can be firmly assembled as a whole. The compression spring 19 also urges against the end face of the connection head 16 whereby the mating between the projection 17 and the recess 110 is maintained securely.

The inner diameter of the second section 32 of the exterior tube 30 is slightly larger than the outer diameter of the interior tube 20, so that the interior tube 20 holding the optical fiber cable can be slightly swung therein. In this manner, the optical fiber cable can be slightly curved.

The protecting ring 35 is made of an elastic material and has an inside diameter slightly smaller than an outside diameter of the loop recess 34 and also length slightly shorter than a length of the loop recess 34. The protecting ring 35 is pushed along and over the exterior tube 30 to be received in the loop recess 34 thereof, so that the boss 15 extending through the slot 33 will not be exposed.

It is clear that the structure of the optical fiber connector in accordance with the present invention includes only a few components. In addition, each component of the optical fiber connector is simple. Accordingly, such an optical fiber connector is easily manufactured, and the manufacture cost can be reduced.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical fiber connector comprising:

a head lid having a disc with a central through hole, a terminal portion, which is hollow and extending from a front surface of the disc, and a hemicylindrical piece extending from a rear surface of the disc, said disc having a recess defined in the rear surface thereof, said hemicylindrical piece having a boss formed on an outer wall thereof;

a connection head having a hollow body and a hollow stepped pillar extending from the body for enclosing and holding an optical fiber, said body having a projection, which is shaped in correspondence with the recess of the head lid so as to be matchingly received in said recess when the stepped pillar extends through the central through hole of the disc and the terminal portion of said head lid;

[an interior tube having a flange formed an outer wall thereof, said interior tube being disposed behind the connection head;]

an exterior tube including a first section having a large inner diameter and a second section having a small inner diameter, and a junction edge being defined on an inner wall of the exterior tube by the different diameters of the first section and the second section, the exterior tube having a hole defined in a wall thereof, [the interior tube extending through the exterior tube and the flange of the interior tube being resisted against the junction edge,] the head lid engaged with the connection head extending into the exterior tube so that the boss of the head lid is extended into the hole of the exterior tube to be received therein.

[2. The optical fiber connector as claimed in claim 1, further comprising a spring disposed between the connection head and the interior tube.]

3. The optical fiber connector as claimed in claim 1, wherein said hemicylindrical piece of the head lid has two slots defined therein to define a resilient tongue, and the boss is formed at the position on the resilient tongue.

4. The optical fiber connector as claimed in claim 1, further comprising a protecting tube provided to the exterior tube so that the boss of the head lid extending through the recess of the exterior tube will not be exposed.

5. The optical fiber connector as claimed in claim 4, wherein the exterior tube has a loop recess defined in an outer wall thereof to receive the protecting tube.

*6. The optical fiber connector as claimed in claim 1 further comprising an interior tube having a flange formed on an outer wall thereof, said interior tube being disposed behind the connection head and extending through the exterior tube and the flange of the interior tube being resisted against the junction edge.*

*7. The optical fiber connector as claimed in claim 6, further comprising a spring disposed between the connection head and the interior tube.*

* * * * *